United States Patent Office 2,774,754
Patented Dec. 18, 1956

2,774,754
METHOD OF DISPOSING AND UTILIZATION OF SULFITE WASTE LIQUOR

Albert Schnell, Zurich, Switzerland

No Drawing. Application December 10, 1953, Serial No. 397,486

Claims priority, application Switzerland December 15, 1952

1 Claim. (Cl. 260—124)

This invention relates to a process of disposing of and utilising sulfite waste liquor.

It is a known fact that in the manfacture of sulfite cellulose about 50% of the wood material are lost in the waste liquor. Many attempts have been made to recover the calcium salt of lignosulfonic acid from such waste liquors by precipitation. These methods have, however, the drawback of producing again fresh waste liquors containing still considerable amounts of organic substances so that the draining ditches of the cellulose plants are not substantially relieved.

It has also been proposed to dehydrate waste sulfite liquor by partially evaporating its water content, alkalizing the residue with diluted NaOH, concentrating again and treating the concentrate with quick lime (CaO). This process involves concentration, dilution and reconcentration and the use of the relatively expensive quick lime which makes it unfeasible from an economic point of view.

In contradistinction thereto the present invention provides an improved process for disposing of the burdensome sulfite waste liquor in a simple, effective and economical manner without the use of diluted NaOH, quick lime, filters or draining ditches, to transform said liquor into a solid product which may be used as fuel or as fertilizer, thus also avoiding water pollution.

The process according to the present invention involves the steps of concentrating crude sulfite waste liquor as it is obtained from sulfite cellulose plants at a temperature in the range of about 50-100° C., preferably 60° C. in a multi-stage vacuum evaporator under a vacuum of about 70-90%, preferably about 80% to a water content of about 20-40% preferably about 30%, while maintaining the pH of the liquor within the range of about 5-6, followed by a further evaporation at atmospheric pressure and a temperature of about 70-90° C. preferably about 80° C. in a film evaporator to further reduce the water content to about 10-20% preferably about 15% while maintaining the pH in the same range and mixing the thus obtained concentrated liquor in a planetary mixer while still hot with a sufficient amount of calcium hydroxide to bring the pH of the mixture within the range of 7.2-8.

It is very important to perform the evaporation steps in acidic condition. When the pH is constantly held within the range of about 5-6 no incrustation of the apparatus even at temperatures up to 100° C. will take place. The multi-stage vacuum evaporator may be of conventional design. The film evaporator is of the type wherein the liquid to be evaporated flows in a thin film along heated walls of an evaporating chamber.

Neutralization is best effected with the inexpensive carbide sludge which is an undesirable waste product of the acetylene gas production and is available in unlimited amounts.

A further important feature of this invention is the performance of the neutralizing step in a planetary mixer which causes an intimate contact of the concentrate with air, thus promoting a further polymerization of the solids in the neutralized concentrate. The amount of carbide sludge or calcium hydroxide of other provenience required to neutralize the product is within the range of 2-4% by weight of the concentrated liquor.

Upon cooling, the so-treated product becomes hard and dry and contains about 10-20%, preferably 15% of water. It is not hygroscopic and may therefore readily be stored until it is used as a fuel or fertilizer.

Example

Sulfite waste liquor is concentrated in a multi-stage vacuum evaporator to a water content of about 30% at a tempearture of 60° C. and a vacuum of 80%. This pre-concentrated liquor is then fed through a film evaporator maintained at a temperature of 80° C. under atmospheric pressure and leaves the same conditions of pH and said evaporator with a concentration corresponding to a solid content of about 85% (15% water). Then this concentrated liquor having a temperature of 80° C. is mixed in a planetary mixer with sufficient carbide sludge to bring the pH value to 7.5 whereby a further thickening due to polymerization takes place. Upon cooling the product becomes hard. The heat of the product is recovered in a heat exchanger. The calorific value of the product averages 2640 calories per kilogram.

While the process may be performed batchwise, I prefer a continuous method of operation.

It will be obvious that this invention provides a simple, effective and economic process for disposing of the two undesirable by-products, namely sulfite cellulose waste liquor and carbide sludge.

What I claim is:

In a method of disposing of and utilising sulfite waste liquid obtained from sulfite cellulose plants, the steps of reducing the water content of the crude sulfite waste liquor down to about 20-40% by multi-stage vacuum evaporation of the crude liquor in a first concentration stage, then further reducing the water content of the so-concentrated liquor down to 10-20% by film evaporation under atmospheric pressure in a second concentration stage, the pH of the liquor in both said concentration stages being at a value within the range of 5-6, and bringing the pH of the final liquid concentrate to a value in the range of about 7.2-8 by mixing it intimately with carbide sludge while maintaining intimate contact with air at a temperature of about 70-100° C. whereby polymerization of the concentrate takes place.

References Cited in the file of this patent

UNITED STATES PATENTS

| | | |
|---|---|---|
| 1,059,716 | Dickerson | Apr. 22, 1913 |
| 1,311,220 | Ellis | July 29, 1919 |